United States Patent [19]
Lewis et al.

[11] Patent Number: 5,872,928
[45] Date of Patent: *Feb. 16, 1999

[54] METHOD AND APPARATUS FOR DEFINING AND ENFORCING POLICIES FOR CONFIGURATION MANAGEMENT IN COMMUNICATIONS NETWORKS

[75] Inventors: Lundy Lewis, Mason; Rajiv Malik; Steve Sycamore, both of Nashua, all of N.H.; Suzanne Thebaut, Amesbury, Mass.; Walter Scott, Salem, N.H.; Eric Rustici, Londonderry, N.H.; Prasan Kaikini, Cambridge, Mass.

[73] Assignee: Cabletron Systems, Inc., Rochester, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 450,854

[22] Filed: May 25, 1995

Related U.S. Application Data

[63] Continuation-in-part of Ser. No. 394,143, Feb. 24, 1995, Pat. No. 5,832,503.

[51] Int. Cl.$^6$ .................................................. G06F 15/177
[52] U.S. Cl. ................................ 395/200.52; 395/200.51
[58] Field of Search .............................. 395/200, 200.5, 395/200.51, 200.32

[56] References Cited

U.S. PATENT DOCUMENTS

| | | | |
|---|---|---|---|
| 5,193,152 | 3/1993 | Smith | 395/200.5 |
| 5,247,683 | 9/1993 | Holmes et al. | 395/200.51 |
| 5,265,241 | 11/1993 | Arnold et al. | 395/835 |
| 5,509,123 | 4/1996 | Dobbins et al. | 395/200.73 |
| 5,557,747 | 9/1996 | Rogers et al. | 395/200.53 |
| 5,793,362 | 8/1998 | Matthews | 395/200.54 |

FOREIGN PATENT DOCUMENTS 0 609 990 A2   8/1994   European Pat. Off. .

OTHER PUBLICATIONS

Lundy Lewis; Implementing Policy in Enterprise Networks; IEEE Communications Magazine, vol. 34, Issue 1; pp. 50–55, Jan. 1996.

Terplan, Communications Networks Management "Configuration Management," (Chapter 7, pp. 199–262), Second edition, Prentice Hall, Englewood Cliffs, New Jersey 07632 (1992).

Sloman, Network and Distributed Systems Management, Addison–Wesley Publishing Company, Wokingham, England (1994).

"Domains: A Framework For Structuring Management Policy" (Chapter 16, pp. 433–453).

(List continued on next page.)

Primary Examiner—Parshotam S. Lall
Assistant Examiner—Kenneth R. Coulter
Attorney, Agent, or Firm—Wolf, Greenfield & Sacks P.C.

[57] ABSTRACT

Apparatus and method for monitoring parameters that govern the operational characteristics of a network device, including the use of templates for generating configuration records of network devices of a selected model type. A database of models is provided, each model representing an associated network device and including attribute values for the parameters of the associated network device. Templates are used to screen a model in order to retrieve values for each of the attributes and create a configuration record. The configuration records may be stored in the configuration manager or other storage device, and/or transferred to the pre-existing model database for use by a network management system in reconfiguring the associated network devices. Additionally, a method and apparatus is provided that defines network groups, defines network policies for groups, determines conflicts, and resolves conflicts among groups and devices. This system for configuration management is less time consuming, expensive, and error prone than prior systems.

40 Claims, 13 Drawing Sheets

OTHER PUBLICATIONS

Moffett, "Specification of Management Policies and Discretionary Access Control," (Chapter 17, pp. 455–480).

Magee, "Configuration of Distributed Systems," (Chapter 18, pp. 483–497).

Ericson et al., Expert Systems Applications In Integrated Network Management, "Configuration Management Applications," (Chapter 3, pp. 151–192), Artech House, 685 Canton Street, Norwood, MA 02062 (1989).

Weis, Journal of Network Systems Management, Plenum Publishing Corp., "Policies In Network And Systems Management—Formal Definition And Architecture," Plenum Publishing Corp., (1994).

Roos et al., Integrated Network Management III, "Modelling Management Policy Using Enriched Managed Objects," Elsevier Science Publishers, North holland, pp. 207–215 (1993).

Jonathan D. Moffett and Morris S. Sloman, "Policy Hierarchies for Distributed Systems Management", *IEEE Journal on Selected Areas in Communications,* vol. 11, No. 9, Dec. 1993, pp. 1404–1414.

Jonathan D. Moffett and Morris S. Sloman, "Policy Conflict Analysis in Distributed System Management", *Journal of Organizational Computing,* 4(1) 194, pp. 1–22.

Cheriton et al., "Host Groups: A Multicast Extension For Datagram Internetworks," Data Communications Symposium, Sep. 1985, pp. 172–179 (USA).

"Method For Assigning Network Applications To Users and Groups," IBM Technical Disclosure Bulletin, vol. 37, No. 4b, Apr. 1994 (New York, USA).

```
09:30 AM WED JAN 26 1994                          PAGE 1
         SPECTRUM CONFIGURATION MANAGER

TEMPLATE LISTING FOR NEW_CONFIG_TEMPLATE

ATTRIBUTE
  ─────────

AT_IF_INDEX
  AT_NET_ADDR
  AT_PHYS_ADDR
  APPS_CREATED_STATE
  AUTOPLACEOFFSETX
  AUTOPLACEOFFSETY
  AUTOPLACESTARTX
  AUTOPLACESTARTY
  COMMUNITY_NAME
  CONDITION
  CONDITION_VALUE
  CONTACTPERSON
  CONTACT_STATUS
  DATARELAYCLASS
  DESC_KEY_WORD
  DEV_CONTACT_STATUS
  DEVICETYPE
  DEVICE_NAME
  DEVICE_TYPE
  DISPOSABLE_PRECEDENCE
  EDIT_COUNT
  GENERALDISCCLASS
  SYSNAME
  SYSTEM_OID_VERIFY
  SYSTEM_UP_TIME
  TIMEOUT
  TRYCOUNT
  VIB_DISPLAY_LIST
  VIB_RASTER_NAME
  VALUE_WHEN_ORANGE
  VALUE_WHEN_RED
  VALUE_WHEN_YELLOW
  ZOOM_FACTOR
  ATTR_TO_READ
```

— 40
— TEMPLATE

```
09:24 AM WED JAN 26 1994                          PAGE 1
         SPECTRUM CONFIGURATION MANAGER

CONFIGURATION LISTING FOR NEW_CONFIG

ATTRIBUTE                      VALUE
  ─────────                      ─────

AT_IF_INDEX.2.1.132.177.141.10    2
  AT_NET_ADDR.2.1.132.177.141.1     86.8D.8F.1
  AT_PHYS_ADDR.2.1.132.177.141.1    00.0C.4.E3.63
  APPS_CREATED_STATE                1
  AUTOPLACEOFFSETX                  0
  AUTOPLACEOFFSETY                  30
  AUTOPLACESTARTX                   100
  AUTOPLACESTARTY                   50
  COMMUNITY_NAME                    PUBLIC
  CONDITION                         6
  CONDITION_VALUE                   0
  CONTACTPERSON                     LISA
  CONTACT_STATUS                    2
  DATARELAYCLASS                    4
  DESC_KEY_WORD                     8.2(4):8.2(5)
  DEV_CONTACT_STATUS                2
  DEVICETYPE                        CISCOMIM
  DEVICE_NAME                       <NO VALUE>
  DEVICE_TYPE                       <NO VALUE>
  DISPOSABLE_PRECEDENCE             10
  EDIT_COUNT                        1
  GENERALDISCCLASS                  1
  SYSNAME                           ENAX
  SYSTEM_OID_VERIFY                 1.3.6.1.4.1.9.1.5
  SYSTEM_UP_TIME                    180337411
  TIMEOUT                           3000
  TRYCOUNT                          3
  VIB_DISPLAY_LIST                  0.0.0.0.6D.73.0.F8
  VIB_RASTER_NAME                   DEFAULT.CSI
  VALUE_WHEN_ORANGE                 3
  VALUE_WHEN_RED                    7
  VALUE_WHEN_YELLOW                 1
  ZOOM_FACTOR                       100
  ATTR_TO_READ                      230006
```

— 42
— CONFIGURATION

FIG. 3

METHOD AND APPARATUS FOR DEFINING AND ENFORCING POLICIES FOR CONFIGURATION MANAGEMENT IN COMMUNICATIONS NETWORKS

This is a continuation-in-part of application Ser. No. 08/394,143 filed Feb. 24, 1995, now U.S. Pat. No. 5,832,503.

FIELD OF THE INVENTION

The present invention is directed to configuration management of communications networks, and more specifically to an apparatus and method for defining and enforcing configuration policies for configuration management of network devices.

BACKGROUND OF THE INVENTION

Configuration management in communications networks is the task of keeping an inventory of network devices, knowing the configuration of each device, resetting or updating configurations as the need arises, and scheduling configuration changes. In the past, many of these tasks were done manually or by software packages built specifically for a particular device.

A "configuration" is defined as a particular setting of device parameters that govern the operational characteristics of a network device. In communications networks, the devices that are routinely configured are routers, bridges and hubs, and examples of device parameters include port thresholds, on/off switches, access security, etc.

In the prior art, one method of network configuration is to manually configure a network device. In this case, a user physically attaches a dumb terminal to the network device and issues configuration commands through the terminal's keyboard. A disadvantage of this method is that one cannot retrieve or store information regarding the configuration of a device.

A second known method is to make configuration changes with a software package built specially for a network device type. A disadvantage of this method is that one cannot configure different device types simultaneously. Examples of commercially available tools that allow one to configure a single type of device include the following: (1) Site Manager, Wellfleet Communications, Inc., 8 Federal Street, Billerica, Mass. 01821; and (2) Cisco Works, 1525 O'Brien Drive, Menlo Park, Calif. 94025.

Thus, the primary disadvantages of the prior art include:
- a user can manually configure only one device at a time;
- a user must know the desired configuration before making a change;
- a user must manually check to see if in fact the desired change took place;
- existing tools utilize only one network management protocol (e.g., the simple network management protocol—SNMP) to manage the device; and
- existing tools are specialized for one particular type of device (e.g., Cisco routers).

A third known method is to define a number of individual devices of specific types as policy domains, and apply policies to the policy domains. A disadvantage of this method is that this method is only applicable to a limited number of specific types of devices. Examples of commercially available tools that allow one to define specific types of devices as groups include the following: Tivoli Works, TIVOLI Systems, Inc., 6034 West Courtyard Drive, Suite 210, Austin Tex. 78730; and MaestroVision, Calypso Software Systems, Inc., 1 Sundial Avenue, Suite 410, Manchester N.H. 03103.

In general, the prior art methods are time-consuming, expensive, error prone, and limited in terms of the operations that can be performed.

SUMMARY OF THE INVENTION

The present invention is directed to a method and apparatus for configuration management of a communications network, and which performs one or more of the following functions:
- enables configuration of several network devices at the same time;
- enables retrieval of a configuration from a device, storage of a configuration, and downloading of the configuration to other devices;
- verifies that configurations have taken place and generates reports and/or alarms when configuration operations are unsuccessful;
- enables automatic scheduling of configuration retrieval, loading and/or verification;
- enables configuration of a wide variety of different network devices.

The present invention utilizes a database of models, each "model" representing an associated network device and including attribute values for the parameters of that device. A configuration manager accesses a set of model types, each "model type" having an associated set of attributes. The configuration manager creates a template by selecting a model type and one or more attributes from the associated set of attributes, and then screens a selected model with the template to retrieve the values for each of the attributes in the template from the attribute values in the database, to create a configuration record for the model. The configuration record may then be stored, modified, transferred to a model, and/or displayed to a user on a user interface. Also, multiple templates can be used to create a composite configuration record. Multiple configuration records may be transferred to multiple models in the database, for reconfiguring multiple network devices. In one alternative embodiment, a template may be created from a pre-existing configuration record by extracting the attributes of that record. Other features include the generation of alarms to indicate whether or not a transfer or reconfiguration has been successful, and maintaining a scheduler for automatic capture, load or verification of configuration records.

The terms "model" and "model type" will be more specifically described in regard to the following detailed description. Generally, a model type is analogous to a "class" in object-oriented terminology. Note that a reference to "model type name" is meant to be the same as "model type".

The term "model" is analogous to an "instance of a class" or an "object" in object-oriented terminology. So, a model is an instance of a model type. Again, a reference to "model name" means the same as just "model".

These and other advantages of the present invention are both particularly described in the following detailed description and drawings.

BRIEF DESCRIPTION OF THE DRAWINGS

FIG. 3 illustrates a representative template and a corresponding configuration according to the present invention.

DETAILED DESCRIPTION

In accordance with a specific embodiment of the present invention, configuration management may include identifying, controlling and monitoring the "managed devices" that make up a communications network. A managed device is any device that is modeled in a network management system, such as the Spectrum™ Network Management System available from Cabletron Systems, Inc., 35 Industrial Way, Rochester, N.H. 03867. The managed devices include not only hardware devices such as personal computers (PCS), workstations, hubs and routers, but also software applications.

Figure 1:
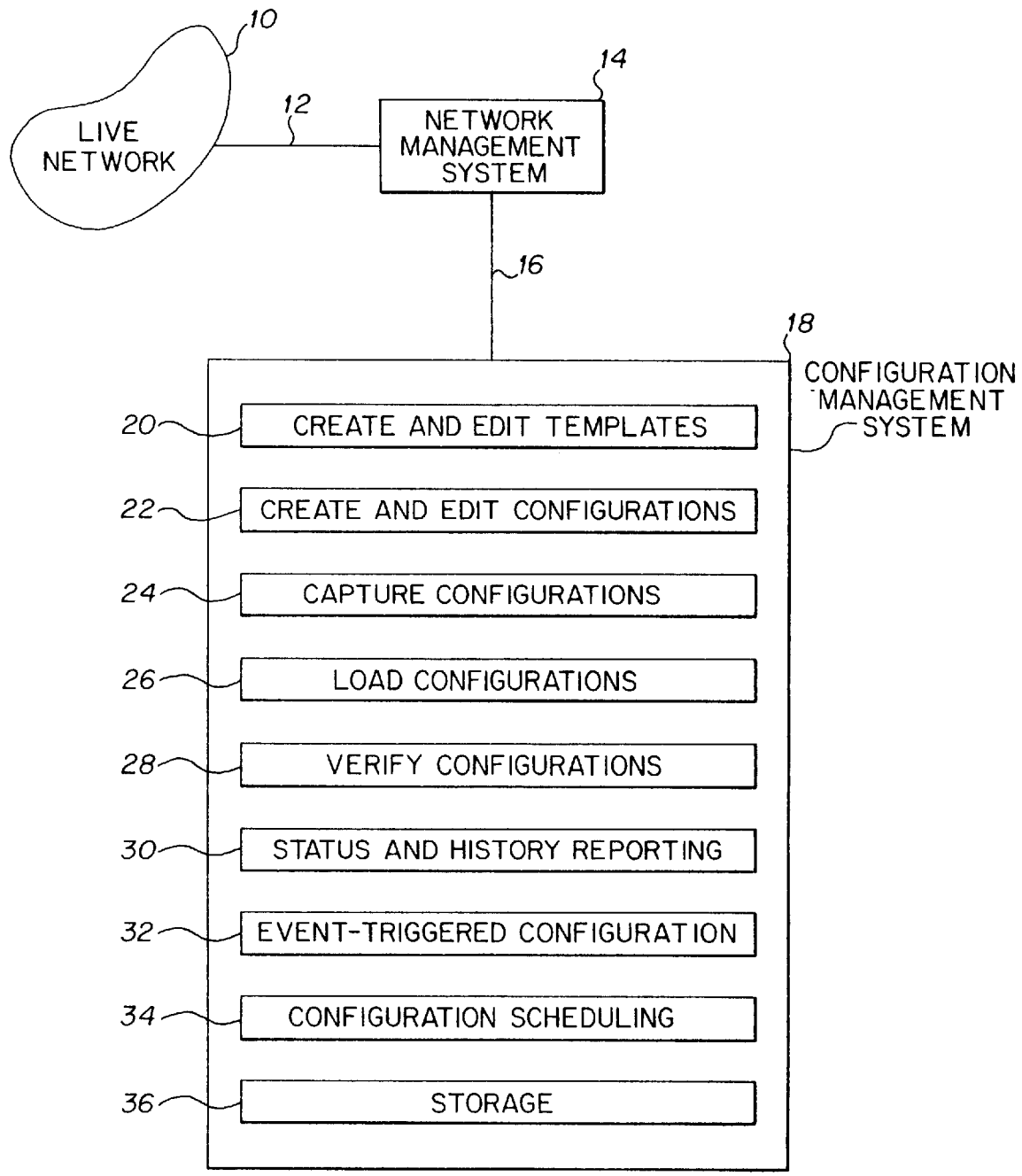
FIG. 1 is a schematic illustration of one embodiment of an apparatus for configuration management according to this invention.

As illustrated in FIG. 1, a network management system 14, such as Spectrum™, continually monitors the network and maintains a database of information about every managed device in the network. In accordance with this invention, a configuration manager 18 obtains the values of certain attributes (i.e., data which define the characteristics of the network device being modeled) in a desired configuration by interrogating the Spectrum™ model of the managed device. The configuration manager then enables a system administrator, via a user interface (see FIG. 2), to use this information to manage the device. For example, the administrator may create new configurations, load these configurations to devices anywhere on the network, and then verify whether the configurations have changed.

More specifically, the configuration manager enables a user to create configurations with a template. A template is a list of attributes for a device of a certain model type. When creating a template, the configuration manager provides the user with a list of all readable/writable and non-shared attributes for a model type (which includes the specific device). The user then selects the attributes needed for the template, which depending on the purpose of the template, might include a single attribute (port status, for example) or dozens of attributes.

The configuration manager then captures the values of the attributes listed in the template, by retrieving the values from the Spectrum™ model. The template functions like a filter, blocking out unwanted attributes (IP address, for example) and capturing the values of those attributes found in the template.

The resulting configuration created with the template contains the attributes from the template and the values collected from the model. The configuration may be stored in the configuration manager, in another storage device, or the Spectrum™ database.

FIG. 3 illustrates the difference between a template and a configuration. Item 40 is a template for "new_config template" which includes the list of attributes set forth below the heading "Attribute". Item 42 is the corresponding configuration for "new_config", which includes a list of attributes on the left and corresponding values on the right.

The following glossary of terms is helpful to an understanding of the present invention:

capture: An operation on a model that stores all attribute/value pairs, obtained by interrogating the selected models through a template. That is, the value of only those attributes that can be found within the template are obtained by interrogating the model.

configuration: A record of all attribute/value pairs which are obtained by interrogating the selected models through the template. The record may be stored in a compressed form in the configuration manager.

load: An operation on a model which places the values of the attributes listed in the selected configuration into selected models.

template: A record which contains a list of attributes for which the configurations will provide values.

verify: An operation on a model which involves comparing the model's actual attributes/values with the attribute/value pairs of a configuration.

attribute: A configurable parameter within a model. The development of the model type creates an attribute by publishing the attribute name and range of possible values.

An understanding of the present invention is furthered by an understanding of a model-based network management system such as Spectrum™, which is described in U.S. Pat. No. 5,261,044, issued Nov. 9, 1993 to R. Dev et al., and hereby incorporated by reference in its entirety. The Spectrum™ network management system is commercially available and also described in various user manuals and literature available from Cabletron Systems, Inc., Rochester, N.H.

In summary, Spectrum™ is a system for maintaining and processing information pertaining to the condition of the computer network and providing the same to a user, the network including a plurality of network entities such as computer devices and software applications being executed on such devices. The system includes a virtual network machine, comprising a programmed digital computer, wherein a program is implemented using an object-oriented programming language such as C++, Eiffel, SmallTalk, and Ada. The virtual network consists of interrelated intelligent models of network entities and relations between network entities, including means for acquiring network data pertaining to the condition of a network entity from the corresponding network entity. The virtual network further includes means for maintaining objects which include network data relating to the corresponding network entity and one or more inference handlers for processing the network data, the inference handlers being responsive to changes occurring in the same and/or a different object. The network data can then be transferred to a user interface coupled to the virtual network machine, for supplying the network data to a user.

Thus, the models are implemented as software "objects" containing both "data" (attributes) relating to the corresponding network entity and one or more "inference handlers" (functions) for processing the data. See Grady Booch, "Object-Oriented Analysis And Design, With Applications," 2nd Edition, Benjamin/Cummings Publishing Co., Redwood City, Calif., Chapter 2, 1994. The inference handlers are initiated by predetermined virtual network events, such as a change in specified network data in the same model, a change in specified network data in a different model, and predefined events or changes in models or model relations. Information pertaining to the condition of the network entity can be obtained from the network entity by polling the same, can be automatically received from the network entity (without polling), or can be inferred from data contained in other models. An alarm condition may be generated when the network data meets a predetermined criteria. Events, alarms and statistical information from the virtual network are stored in a database and are selectively displayed for the user.

The data in the Spectrum™ database may be used for generating topological displays of the network, showing hierarchial relationships between network devices, isolating a network fault, and reviewing statistical information.

Spectrum™ allows for collective management of autonomous local area networks (LANs), with equipment from different vendors. It complies with the current simple network management protocol (SNMP) standards, and can also accommodate other standard and proprietary protocols. The virtual network machine preprocesses the raw information coming from the network devices in order to construct a model of the network's current status and performance characteristics. Network elements that cannot be directly communicated with (e.g., cables and buildings) can infer their status from the status of the devices connected to (or contained within) them. The virtual network machine provides a consistent interface for management applications to access any of the information in the model and thereby provides these applications with a unified view of the network.

Spectrum™'s associated SpectroGRAPH™ user interface provides a highly graphical multi-perspective view into the network model. SpectroGRAPH™ enables the user to navigate through a landscape in which cables, networks, local area networks and even rooms show up as icons, and which icons indicate the health and performance characteristics of those elements. These icons can be further queried for additional information. SpectroGRAPH™'s main function is to visually present to the user the model within the virtual network machine. It allows the user to navigate freely within the network model, only limited by the access rights assigned by the network administrator. The information can be accessed at varying degrees of detail, from a macro overview, to the devices and cables which connect them. In addition to its navigation functions, SpectroGRAPH™ provides an alarm management facility, an event log window, a reporting facility, a find facility, and other features.

The above description of the Spectrum™ system provides a context for an understanding of the present invention. As described in greater detail below, the configuration manager of the present invention utilizes certain aspects of the Spectrum™ system to provide a configuration management system which is less time-consuming, expensive and error prone.

FIG. 1 is a block diagram illustrating generally the method and apparatus of the present invention. A network management system 14 monitors a live network 10 via communication link 12. In this example, the network management system is Spectrum™, which includes a database of models and model types relating to corresponding network entities. A configuration management system 18 is connected via communication link 16 to the network management system 14. In this embodiment, the configuration management system 18 is software implemented in an object-oriented programming language such as C++, and developed on a Sun OS platform. The configuration management system may be invoked from an icon subview menu within the SpectroGRAPH™ user interface, which forms part of networking management system 14.

The configuration management system 18 according to the present invention includes the following features/functions:

create and edit templates 20;
create and edit configurations 22;
capture configurations 24;
load configurations 26;
verify configurations 28;
status and history reporting 30;
event-triggered configuration 32;
configuration scheduling 34; and
storage 36.

These features/functions will be described in greater detail below.

Figure 2:
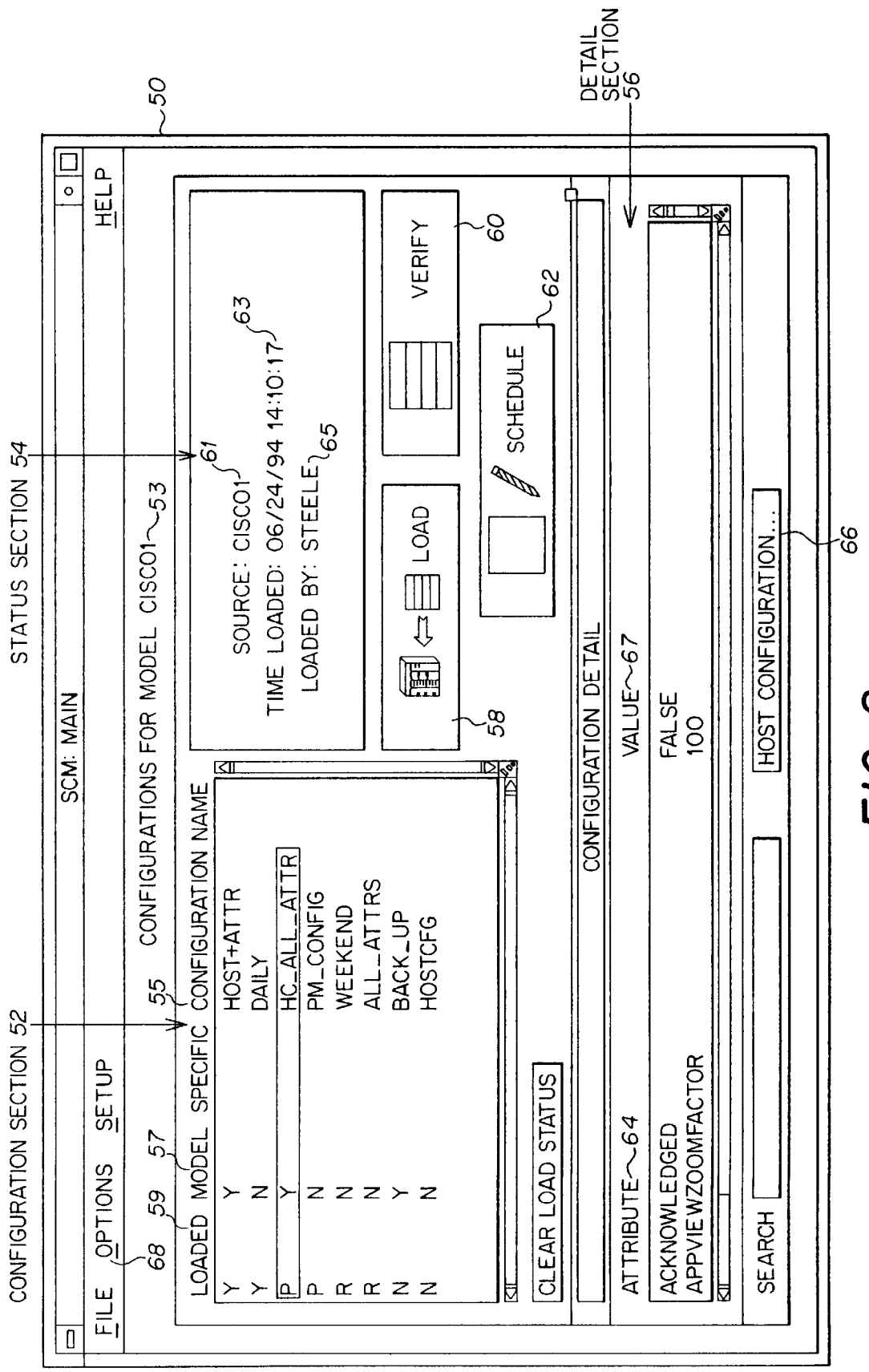
FIG. 2 is a main window display from a user interface illustrating the configuration data and options which may be selected according to one embodiment of this invention.

FIG. 2 illustrates the main display screen for the configuration management system as displayed on SpectroGRAPH™. The display 50 includes a configuration section 52 which lists the available configurations by name and information about the selected configuration in other fields. These configurations all relate to the model "Cisco 1" (i.e., a type of Cisco router) previously selected by the user, as indicated on the display. The configurations listed in section 52 can be loaded to the selected model or to other models of the same model type, and further to schedule automatic loads as described below. The load and schedule operations are initiated by selecting the icons 58 and 62, respectively. The verify operation, designated by icon 60, enables the user to verify the configuration of the selected model or models, and also to schedule automatic verifications as described below.

The "Configuration Name" field 55 contains the names of configurations that have previously been created for models of the same model type as the model selected by the user (as shown in line 53). The "Model Specific" field 57 shows whether the configuration is specific to this model or whether it will be included in the configuration list of other models of the same type. The "Loaded" field 59 shows the most recent load status of the configuration, for example: y=successful, n=not loaded, p=partially loaded, and r=rolled back. These will be further defined below.

The status section 54 includes a "Source" field 61 containing the name of the model from which the configuration was captured. The "Time Loaded" field 63 indicates the last date and time the configuration was loaded. The "Loaded By" field 65 designates the log-in name of the person who loaded the configuration.

The detail section 56 displays information about the attributes that are in the selected configuration. This enables the user to view the attributes in the configuration before the user elects to load the configuration to a model. The "Attribute" field 64 contains a list of attributes in the configuration and their instance IDs, if any. The "Value" field 67 contains the values of the attributes, which can be numbers or text strings.

The "Host Configuration" button 66 at the bottom of the window provides the user with the additional options of viewing, editing, printing and loading a host configuration, as opposed to a Spectrum™ configuration. For example, the host configuration file on a Cisco router contains the setup commands used to configure that router. When a user captures or creates a Cisco router configuration, the host configuration button appears at the bottom of the display. This enables a user to perform all of the configuration management operations on the Cisco host configuration. Cisco router is a trademark of Cisco Systems, Inc., Menlo Park, Calif.

Figure 4:
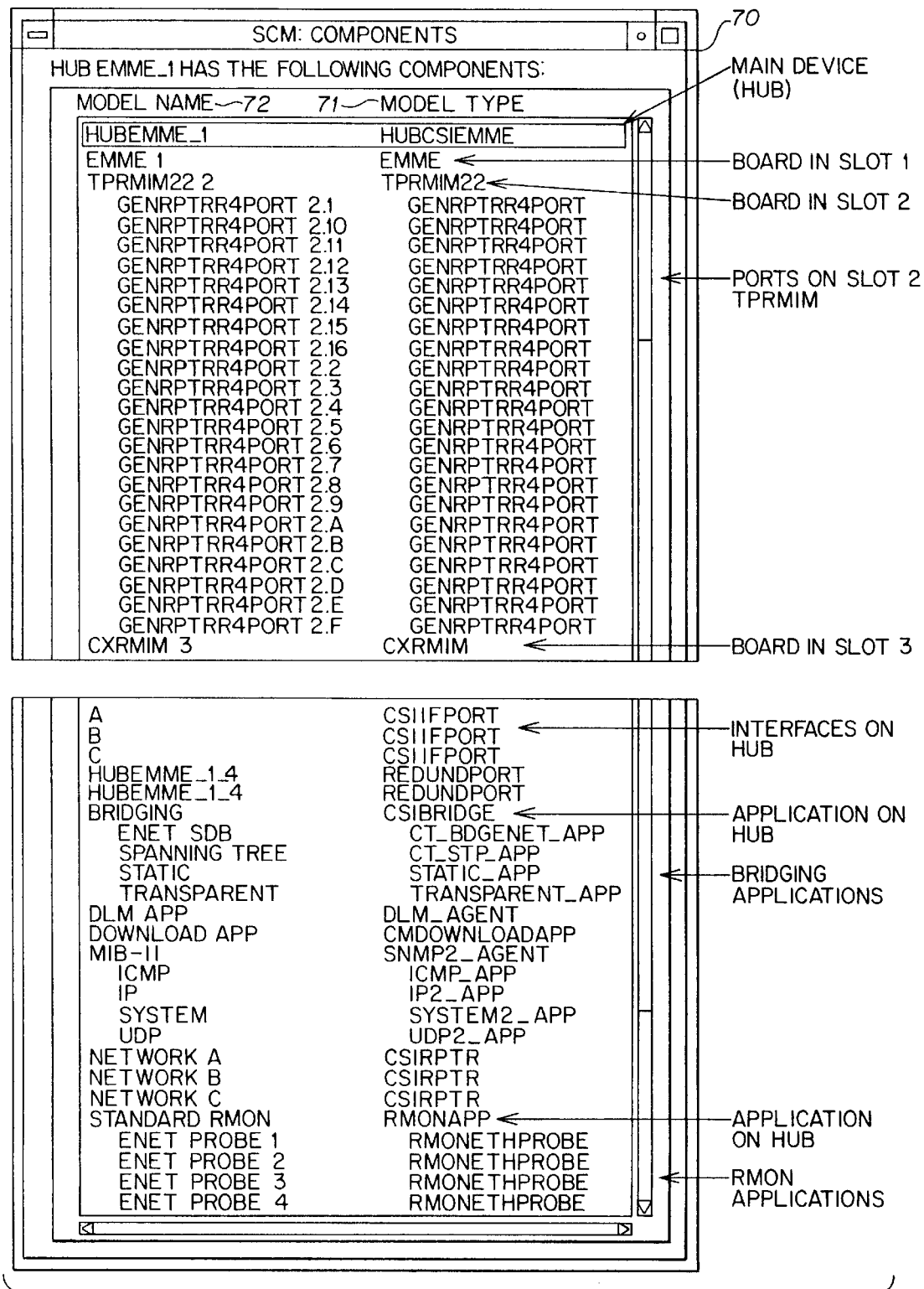
FIG. 4 is a components window display outlining the components of a main network device (e.g., hub), showing model name and model type according to one embodiment of this invention.

The display screen illustrated in FIG. 4 is a components display 70. This screen is under the "Options" menu 68 on the main display screen (FIG. 2). In FIG. 4, a user has selected the components for "HubEmme__1" and display 70 lists all components according to their relationship to the main device. The main device (HubCSIEmme—a hub sold by Cabletron Systems, Inc.) appears at the top of the right-hand list under the heading "Model Type" 71, and all components of this main device, for example, boards, interfaces, and applications, appear below the main device. All subcomponents appear indented under the component. On the left-hand side, under the column heading "Model Name" 72, are the specific instances of these components. For example, FIG. 4 illustrates that the main device has an Emme board in slot 1, a TPRMIM22 board in slot 2, and then lists all of the ports on slot 2. Following all of the boards, there are listed the interfaces on the hub and then the applications on the hub.

Figure 5:
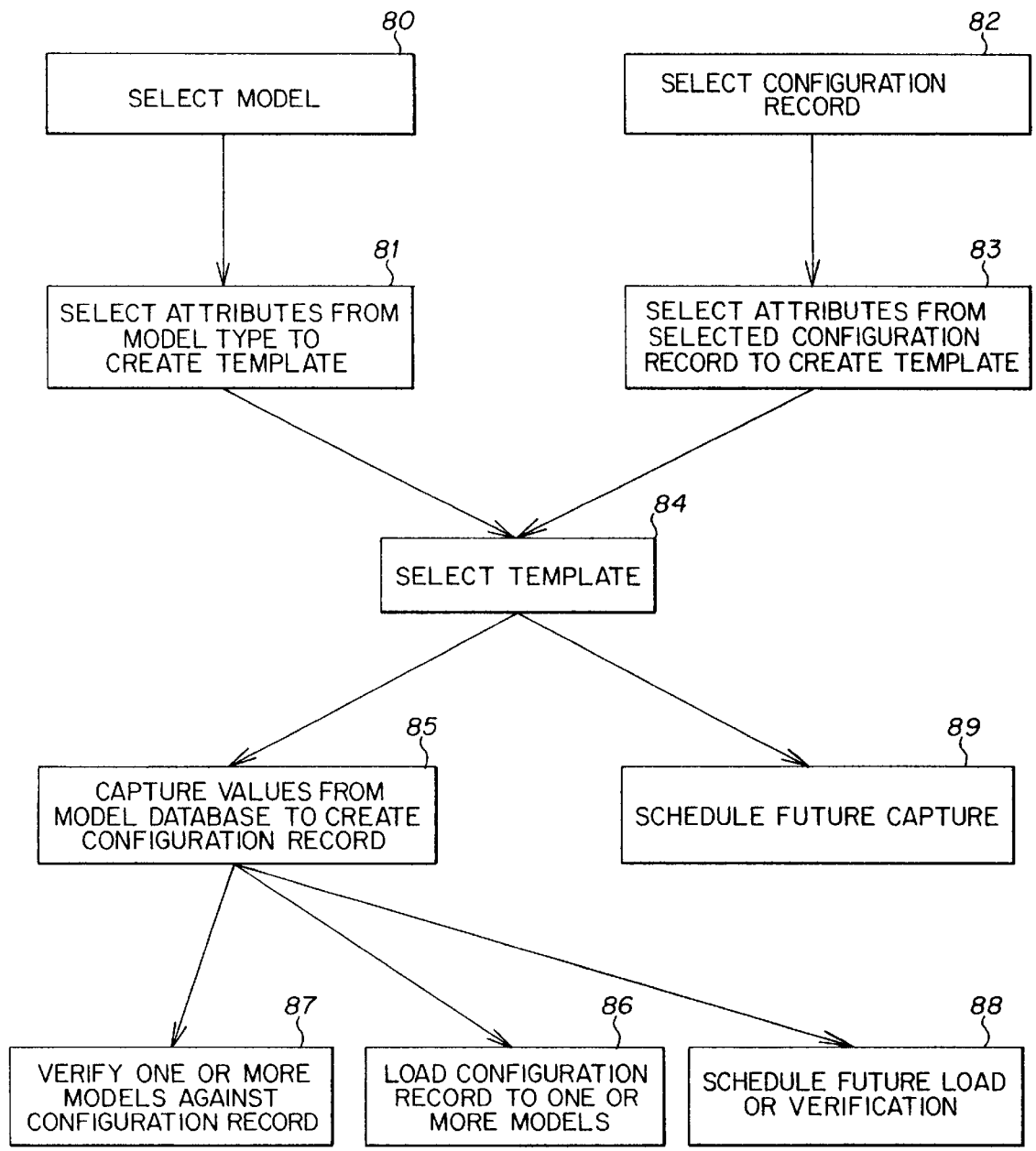
FIG. 5 is a flow chart of the basic configuration operations according to this invention.

The operation of the configuration management system will now be described in greater detail, with reference to the general flow chart of FIG. 5. A summary of FIG. 5 is outlined below, followed by a more detailed discussion:

Select Model (80)
    Connect to model database
    Display available model/modeltype pairs
    Highlight/check model of interest
Create template by selecting model type attributes (81)
    Retrieve all attributes from the related modeltype
    Highlight/check attributes of interest
    Save collection of attributes as a template
Select configuration record (82)
    Connect to configuration record database
    Display available configurations
    Highlight/check configuration of interest
Create template by selecting configuration attributes (83)
    Retrieve all attributes in configuration record
    Save collection of attributes as a template
Select template (84)
    Connect to template database
    Display available templates
    Highlight/check template of interest
Create configuration record (85)
    Connect to model database
    Use template as an index to retrieve attribute values
    Save collection of attribute/value pairs to configuration record database
Load configuration record (86)
    Connect to model database
    Display available models
    Highlight/check models of interest
    Place parameter values from configuration record into the model
Verify model(s) against configuration record (87)
    Connect to model database
    Connect to configuration data base
    Display available models
    Display available configurations
    Highlight/check models of interest
    Highlight/check configuration of interest
    Report discrepancies between attribute/value pairs after comparison
Schedule future load or verification (88)
    Connect to configuration record database
    Display available configurations
    Highlight/check configuration of interest
    Schedule loads or verifications
Schedule future capture (89)
    Connect to template database
    Display available templates
    Highlight/check templates of interest
    Schedule captures The configuration manager allows the user to create configurations in two ways—either with templates or manually without templates. During both processes, the configuration manager captures attribute values and instance IDs, if any, from the selected model. The capture process provides an efficient way to "populate" a configuration, reducing the chances of human error. The user can then modify attribute values and instance IDs when necessary.

The configuration manager allows the user to create the following types of configurations:

configurations that can be loaded to the model selected by the user, or to other models of that model type.

model-specific configurations that are restricted to one device and cannot be loaded to other devices. When the model specific option 57 (FIG. 2) is selected for a configuration, the configuration manager displays the configuration only in the configuration listing of the specified device.

multiple configurations that can be loaded sequentially to a single device. For example, a user may create multiple configurations when it is necessary to configure certain attributes before configuring others, or when configurations are very large.

Once a configuration is created, the user can use the load and verify options. The load option enables the user to load the configuration to the model from which it was captured or to one or more models of the same type. This is how one configures new models or reconfigures existing ones. The verify option enables the user to verify whether models' attribute values match that of the configuration created.

Managing Templates

Templates are useful to create configurations quickly. A library of templates provides administrators with an efficient way to create configurations.

A template is created by selecting a model (step 80) and then selecting one or more attributes of the model type of the selected model (step 81). The template can later be edited by adding to or deleting selected attributes.

An alternative method (steps 82–83) of creating a template is from a configuration that has been created manually, or captured with the template and then modified. In this case, the configuration manager takes the attributes listed in the configuration, creates a template from them, and gives the template the same name as the configuration.

Managing Configurations

A user first selects the desired template (step 84). The configuration manager then uses the template to capture the values of those attributes specified in the template and lists the captured attribute/value pairs in a new configuration (step 85). The configuration manager captures all instances of an attribute, where applicable. The template thus functions as a filter, blocking out unwanted attributes and capturing the values of those attributes specified in the template. Some attributes—IP address, for example, should not be captured in a configuration that will be applied to multiple devices. Therefore, the template used to capture this configuration should not include the IP address attribute.

When creating a configuration with a template, the configuration manager only includes in the configuration those attributes that can be retrieved from the model. If the configuration manager cannot capture attributes specified in the template, it shows the user the attributes that were not captured. The user can then insert those attributes and values by editing the configuration later, if necessary.

Loading a Configuration

Once a configuration is created either manually or with the template, the user can load the configuration to one or more models (step 86). As a first alternative, the configuration manager will apply a configuration to the selected model; as a second alternative, the configuration manager will apply a configuration to any number of models of the same model type as the selected model.

A "safe load" option helps administrators control the load process. When the safe load option is activated, the configuration manager captures the model's configuration before loading a new configuration to it. If the load fails, the configuration manager tries to restore (i.e., roll back) the original configuration to the model.

The configuration section 52 in the main window 50 (FIG. 2) shows the load status of the configurations which have been created. Successfully loaded configurations (Y) appear first, then partially loaded configurations P, then rolled-back configurations (R). Within these three subcategories, configurations are sorted according to the time of the load, the most recent load appearing first. Configurations that have not been loaded (N) are sorted according to the time they were created—the most recently created appearing first. Configurations that have not been loaded (N) are sorted according to the time they were created—the most recently created appearing first.

Once a configuration record is loaded to the model, the network management system 14 will modify the parameters of the network device to conform to the configuration data in the model.

Verifying a Configuration

To perform a verification (step 87), the configuration manager first captures the actual configuration of the model and compares each attribute/value pair in the configuration with the current model's actual configuration. The configuration manager may then display the results to a user via the user interface.

In addition, the configuration manager enables the user to verify the configurations of other models of the same model type as a selected model, by creating a sublist of the models in for example, a particular network or area.

Scheduling Tasks

The configuration manager enables administrators to schedule (steps 88 and 89) the time and frequency of automatic captures, loads and verifications. More specifically, this feature may be used to:

schedule loads, captures and verifications during low-traffic hours.

maintain more stable configurations by scheduling automatic loads at regular intervals.

check the integrity of the network with periodic, automatic captures and verifications of configurations.

The configuration manager sends information about the scheduled operations to the Spectrum™ event log and/or to other storage devices. A user can then view the results of any operation performed by the scheduler.

For example, to schedule a capture, the user will specify the template to be used and the name of the configuration that is created. Then, the user selects a frequency option (hourly, daily, once, weekly, monthly). The scheduled entry is then sent to a scheduling queue.

The event log, which is accessed in SpectroGRAPH™, contains the basic information about each configuration operation. An event log entry shows the time the operation was performed, whether it was successful, and the names of the devices, configurations, and templates when applicable.

The following example is illustrative of the above-described methods.

EXAMPLE

Configuring Ports

The procedures in this example show how the configuration manager may be used to configure ports (i.e., turn on or off) on an "MRXiRptr" repeater. The example assumes that the MRXiRptr is located in slot 2 of a hub and that the ports are all on.

1. In SpectroGRAPH™, select an icon of a hub that contains an MRXiRptr and invoke the configuration manager from it.

Figure 6:
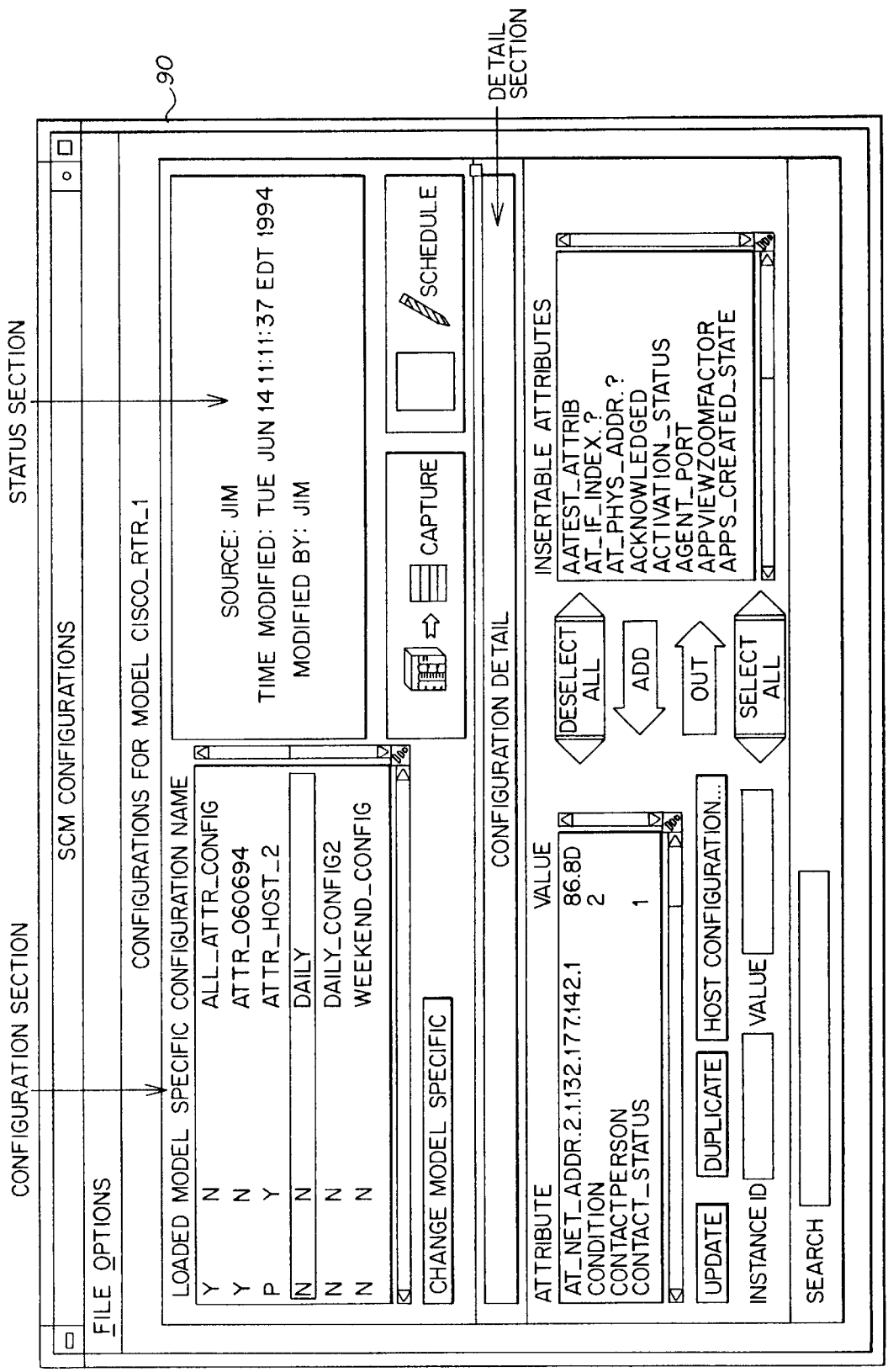
FIG. 6 is a configuration window display for managing configurations according to this invention.

2. Navigate to the specific component that you want to work with—in this case, an MRXiRptr. Follow these steps:

a. In the Main window 50 (FIG. 2), click on Navigate Components in the Options menu 68. This opens a Components dialog box (FIG. 4).

b. Scroll down through the list of components in the Components dialog box, select the MRXiRptr, and click on Apply.

c. Close the Components window. The Main window 50 now displays all the configurations that are available to the MRXiRptr.

d. Open a Configurations window 90 (FIG. 6).

3. In the Configurations window (FIG. 6), manually create a configuration called "Ports1_2_OFF." When completed, the configuration should have the following attributes, instance IDs, and values:

| Attribute | Value |
| --- | --- |
| rptrPortMgmtAdminState 2.1 | 1 |
| rptrPortMgmtAdminState 2.2 | 1 |
| rptrPortMgmtAdminstate 2.3 | 2 |
| rptrPortMgmtAdminstate 2.4 | 2 |
| . | . |
| . | . |
| . | . |

The instance IDs (2.1, 2.2, 2.3, 2.4 . . . ) indicate that this board is located in slot 2 and that there are 4+ ports on the board.

For this particular attribute, a value of 1 means OFF, a value of 2 means ON. Therefore, this configuration will turn ports 1 and 2 off and ports 3 and 4 on.

4. In the Main window 50 (FIG. 2), select the configuration "Ports1_2_OFF" (in section 52), and click on Load 58.

The configuration manager loads the configuration to the MRXiRptr. If a user keeps the Spectrum™ Device View open, he/she can see the ports 1 and 2 turn blue (off) when the configuration is downloaded.

Figure 7:
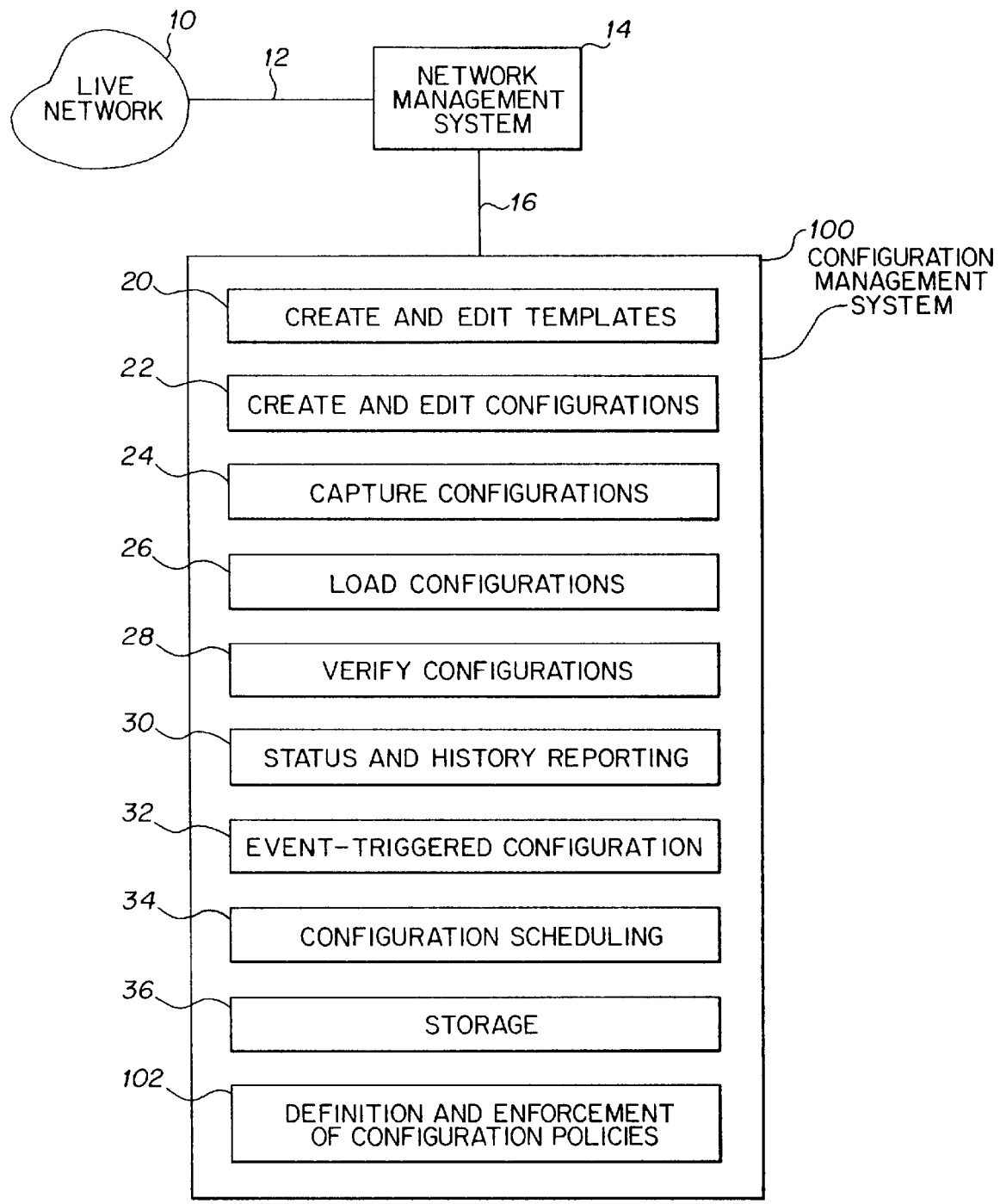
FIG. 7 is a schematic illustration of another aspect of the invention that includes definition and enforcement of configuration policies.

Another aspect of the invention is shown in FIG. 7. In FIG. 7, a configuration management system 100 includes elements 20–36 as described earlier, and also includes definition and enforcement of configuration policies 102. The configuration management system 100 enables all of the functions described earlier.

Figure 8:
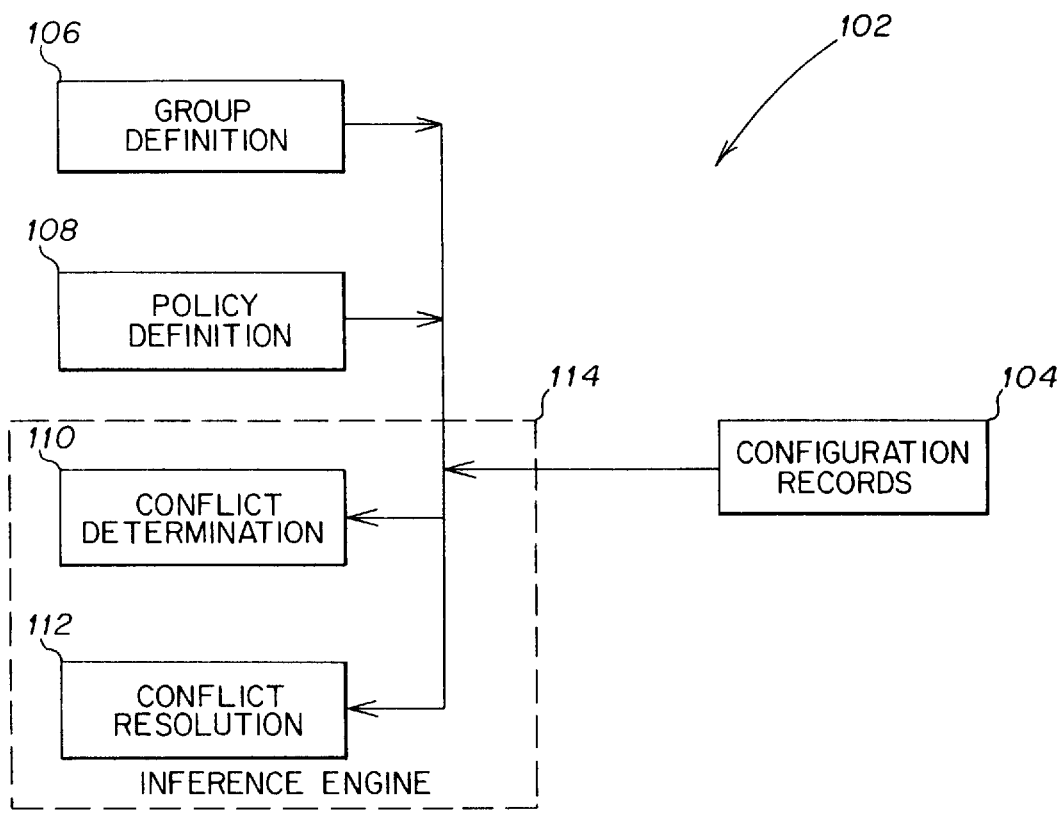
FIG. 8 is a block diagram of an element shown in FIG. 7.

As shown in the block diagram of FIG. 8, the definition and enforcement of configuration policies 102 may include the following modules: configuration records 104; group definition 106; policy definition 108; conflict determination 110; and conflict resolution 112. In a software embodiment, each of these modules may exist on a general purpose computer, and interact through known software techniques. In a hardware embodiment or an embodiment which is a combination of hardware and software, shared memory or communications interfaces may be used to facilitate this interaction.

Each of these modules will be discussed in more detail, beginning with configuration records 104. Configuration records 104 holds the configuration records as disclosed earlier, for example a configuration as shown in item 42 of FIG. 3. Although optional, in this embodiment a configuration record will typically include the attributes model_name and model_type name, also referred to as device_name and device_type. As discussed above, configuration record is a list of attribute/value pairs that may be obtained by interrogating a selected device through a template. The configuration record may be in a compressed form in the configuration manager.

With respect to group definition 106, a group may be a collection of devices, a single device, a single board or port on a device, or a collection of groups. Since a network consists of a number of devices such as switches, hubs, routers, bridges, workstations, printers, and the like, there are several ways in which to characterize the devices into groups. For example, a group may consist of network devices that are connected together in a particular topology, such as a local area network, a metropolitan network, or a wide area network.

Additionally, a group may include a collection of devices in a particular physical location, for example a group of devices in a specific building, or in a specific laboratory. Moreover, a group may reflect other characteristics of the devices, for example devices which are associated with a particular organization of a company. Examples would include a "quality assurance group" and a "sales support group." A group may also consist of any combination of the types of groups described above, as well as other combinations of devices.

Figure 9:
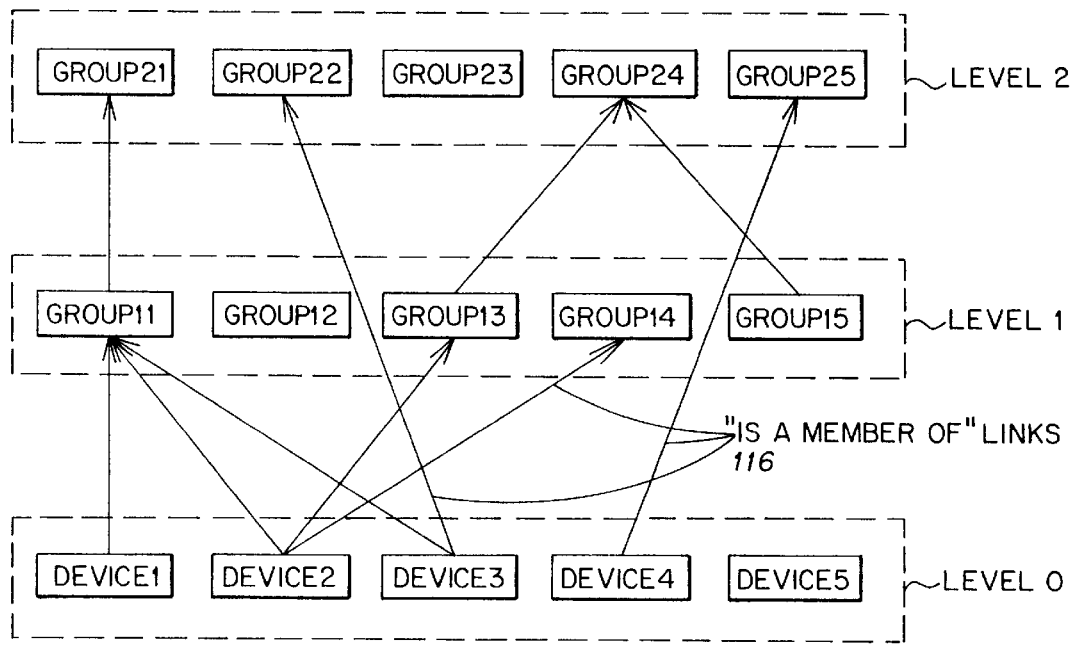
FIG. 9 shows general grouping relationships that may exist among network devices and network groups.

The manner in which devices are grouped may serve as an aid to understand and manage the network, but is not restricted to any particular principle. FIG. 9 gives an exampleof several groups that include several devices. Several levels of abstraction may exist, for example level 0 which includes devices (device1, device2, device3, device4, and device5), level 1 which includes a first layer of groups (group11, group12, group13, group14, and group15), and level 2 which includes a second layer of groups (group21, group22, group23, group24, and group25). These levels are conceptual, and need not be specifically defined, but as will be evident later, there may be advantages to defining such levels. Furthermore, although three levels are shown, there is no limit to the number of levels which may exist. As shown in FIG. 9, a group may contain devices and groups from other levels. Additionally, a device may be a member of several groups. Graphically, the "is a member of" links 116 depict several group relationships. Other expressions may be used to convey a group, such as a "domain", or a "partition." However, the concepts of such groupings are within the scope of this disclosure.

An embodiment of this invention includes a data structure for recording group relationships by creating associations between a group and a device, a plurality of devices, another group, a plurality of groups, or any combination of these. Examples of such a data structure, which are consistent with several of the relationships shown in FIG. 9, are given below:

device1 is a member of group11;

device2 is a member of group11;

device2 is a member of group13;

group11 is a member of group21;

group13 is a member of group24.

Figure 10:
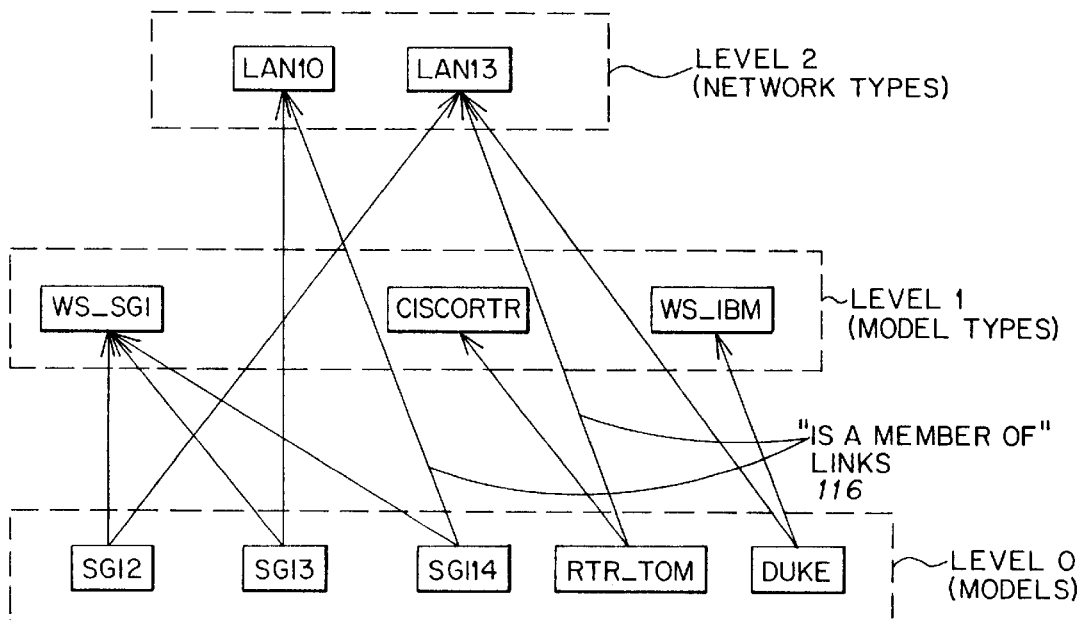
FIG. 10 shows a specific example of grouping relationships such as those shown in FIG. 9.

The first and last terms in the above examples are called identifiers, and the text in between is referred to as associations. Accordingly, the actual data structure may be implemented by any technique which associates the appropriate group members with the appropriate groups. Other terminology may be used to define such a data structure, for example "group11 contains device1", or similar statements. A more specific example of grouping is depicted in FIG. 10. In this example, level 2 is selected to represent network types such as LAN10 and LAN13, while level 1 represents model types (WS_SGI, CiscoRtr, and WS_IBM), and level 0 represents individual models (sgi2, sgi3, sgi14, rtr_tom, and duke). Accordingly, as shown in FIG. 10, a particular model such as sgi2 is a member of group WS_SGI because WS_SGI is the model type of sgi2. Additionally, sgi2 is a member of group LAN13, perhaps because sgi2 is connected to LAN13. As discussed above, these concepts are exemplary, and any principle may be used for grouping devices and groups.

With respect to policy definition 108, a configuration attachment is a relationship between a configuration record and a device. The relationship expresses that a particular configuration record defines the configuration of the device. This may be as a result of a desire by a system administrator, for example. An example would be "configuration_record1 is attached to device3." In this example, the term "is attached to" means that the configuration of device3 should be in accordance with the configuration defined within configuration_record1. Other terms which may be used to convey the same concept are "an attachment", "is associated with," "is enforceable for," "applies to," "is bound to,", etc.

According to an embodiment of the invention, a configuration policy is a data structure representing a list of configuration attachments, and may take the form "CR1 is attached to group1", "CR2 is attached to group3," where CR1 and CR2 are configuration records as discussed earlier. Each attachment in a configuration policy may also include two additional parameters, including an ordering index and a set of conditions.

The ordering index may be used to control the order in which configurations are loaded into a device. For example, some attribute/value pairs such as those shown in FIG. 3 may only be effective if physically loaded onto a device before other attribute/value pairs are loaded onto the device.

The ordering index, typically represented by an integer, allows a user or external system to define such a loading order. For example, a configuration policy might include the following:

Policy1:
   CR1 is attached to group1 with Ordering Index 2;
   CR2 is attached to group1 with Ordering Index 1.

In this example, the attribute/value pairs of CR2 would be loaded into the devices of group1 before the attribute/value pairs of CR1 were loaded into the devices of group1, because the ordering index for the CR2 attachment has a lower value than the ordering index for the CR1 attachment.

The set of conditions constrain the enforceability of the associated attachment, and may define a condition such as a load factor or a configuration status. For example:

Policy1:
   CR2 is attached to group1 if segment_load >50%;
   CR3 is attached to group1 if segment_load <50% and CR3 is not equal to the current configuration of group1.

In this data structure represented by this example, if the parameter segment_load has a value greater than 50%, then the attribute/value pairs of CR2 will apply to group1. If the parameter segment_load has a value less than 50%, and if the current configuration of group1 is not the same as the attribute/value pairs of CR3, then CR3 will apply to group1.

If both an Ordering Index and conditions are to be applied to an attachment, the general form of the attachment is:

Policy1:
   CR is attached to group with Ordering Index I if condition1, condition2, . . .

Accordingly, the Ordering Index will be applied if the conditions specified are met. For example:

Policy1:
   CR1 is attached to group1 with Ordering Index 2 if segment_load >50% and CR1 is not equal to the current configuration of group1;
   CR2 is attached to group1 with Ordering Index 3 if segment_load >50% and CR2 is not equal to the current configuration of group1;
   CR3 is attached to group1 if segment_load <50%.

In this example, if the segment_load parameter has a value greater than 50%, and either CR1 or CR2 does not match the existing configuration of the devices of group1, then configuration record CR1 will be loaded into the devices of group1, after which the configuration record CR2 will be loaded.

A configuration policy may also contain more than one attachment to a particular device. For example:

Policy1 applies to LAN13;
Policy1;
   CR1 is attached to modeltype Cisco_Rtr;
   CR2 is attached to model Cisco_Rtr—14.

In such an instance, if the device Cisco_Rtr_14 is of modeltype Cisco_Rtr, and is contained within the group LAN13, then both attachments of Policy1 are attached to this device. Specifically, the first attachment means that CR1 applies to all routers of modeltype Cisco_Rtr that are within the group LAN13. The second attachment means that CR2 is applied to any individual model named Cisco_Rtr_14 in LAN13.

Similar to the manner in which configuration records may be attached to groups, policies may be "applied" to groups. A policy may also be defined to include an ordering index and a set of conditions, similar to the ordering index and set of conditions for an attachment. For example:

Policy1 applies to group1 with Ordering Index 2 if the time is between 8AM and 5PM;
Policy1 applies to group1 with Ordering Index 3 if the time is between 5PM and 1AM.

The term "applies to" may be used in such a data structure to discriminate between configuration record attachments and policy applications.

Figure 11:
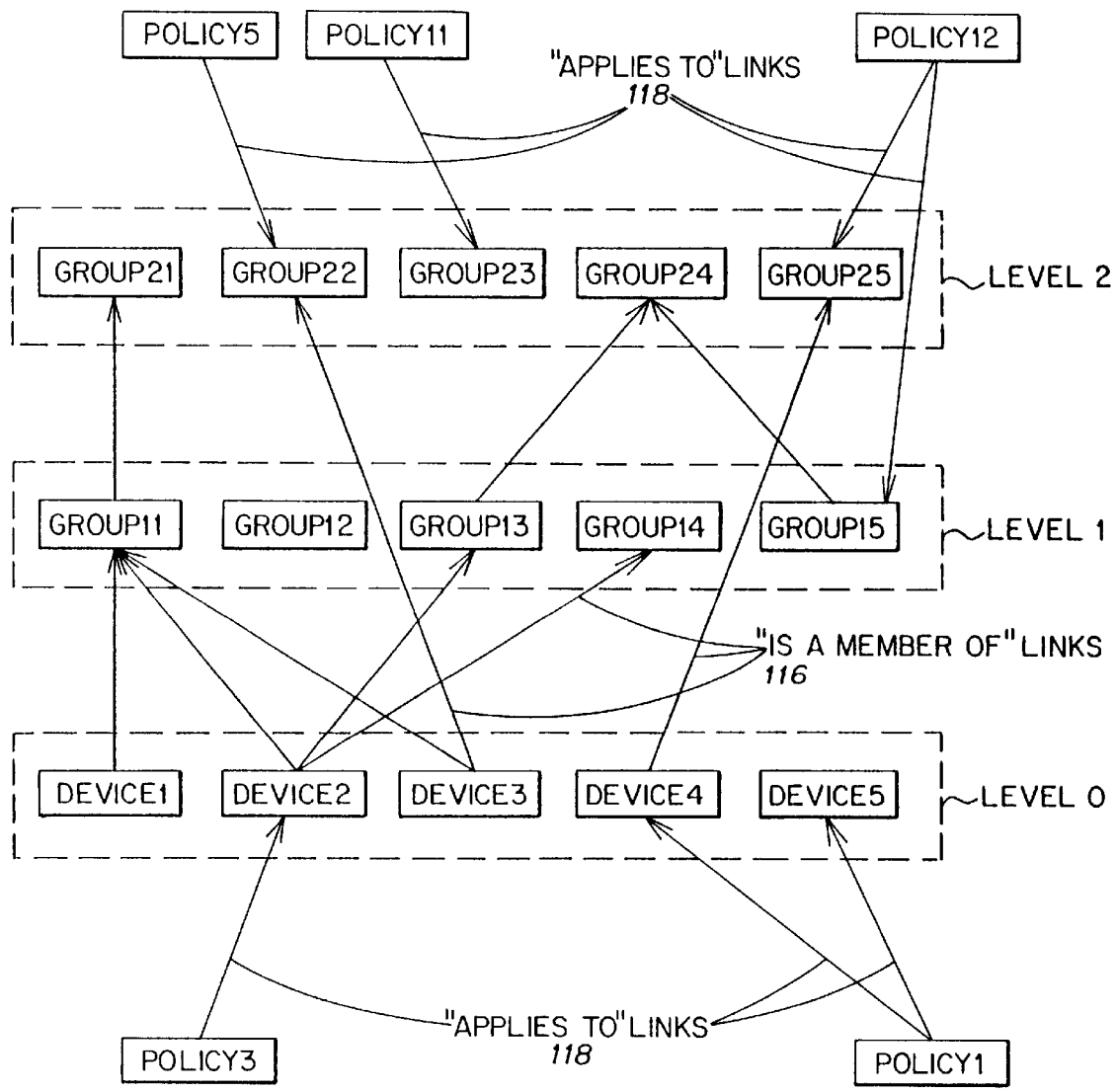
FIG. 11 shows policy links that apply to the devices and groups of FIG. 9.

An example of a number of policies being applied to a number of groups and devices is shown in FIG. 11, which shows the same levels of groups and devices as FIG. 9. In FIG. 11 however, several polices are shown (policy1, policy3, policy5, policy11, and policy12). The "applies to" links 118 are shown to represent that certain policies apply to certain groups and devices. For example, policy1 applies to device4 and device5. Additionally, policy12 applies to group25 and group15. It may be noted that device4 is a member of group25, so that both policy12 and policy1 ultimately apply to device4.

As a result of a policy having several potential attachments to a single device or group, as well as several policies being applicable to a single device or group, it is possible that a single attribute may be defined as having two different values. For example (see FIG. 3), row (a) and row (b) below show two possible attribute/value pairs for the same attribute, that may have been attached to the same device or group of devices as a result of more than one attachments in one policy, or as a result of more than one policy being applied to the device or group of devices:

| Attribute | Value |
|---|---|
| (a) AT_IF_Index.2.1.132.177.141.10 | 2 |
| (b) AT_IF_Index.2.1.132.177.141.10 | 4 |

Assuming that these attribute/value pairs are both valid (any conditions associated with the attachments are satisfied), then a conflict exists regarding whether the value should be 2 or 4. A more detailed example is given below, where CR1 and CR2 are distinct configuration records for a Cisco router, and CR1 contains line (a) above, and CR2 contains line (b) above.

Network Grouping:
   Cisco_Rtr13;
   Cisco_Rtr13 is a member of LAN13;
   Policy1 applies to LAN13;
      CR1 attaches to Cisco_Rtr13;
   Policy2 applies to Cisco_Rtr13;
      CR2 attaches to Cisco_Rtr13.

Note that CR1 attaches to Cisco_Rtr13 in Policy1, and CR2 attaches to Cisco_Rtr13 in Policy2. Since CR1 and CR2 respectively contain the conflicting attribute/value pairs (a) and (b), there is a conflict with regard to the identified attribute. Since there may be many groups, and many policies and attachments for each group, such conflicts may often exist, for example if a user inadvertently builds inconsistent configuration policies. This embodiment provides a method and apparatus for determining and resolving such conflicts.

Figure 12:
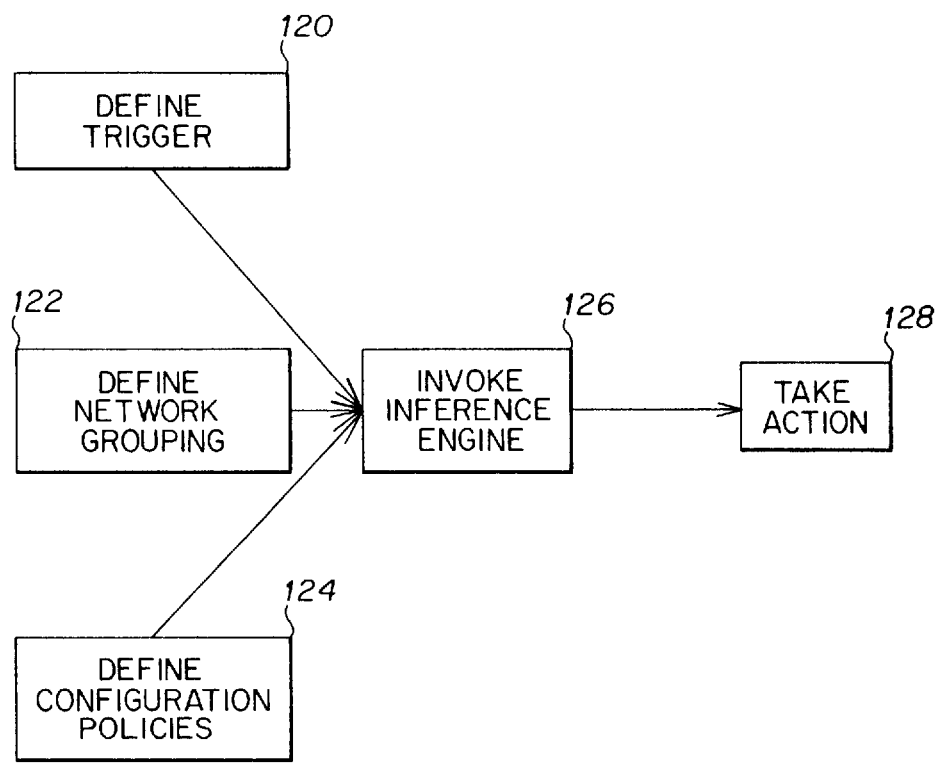
FIG. 12 is a flow diagram showing exemplary steps involved in defining and enforcing configuration policies.

FIG. 12 shows a process for determining and resolving conflicts. In step 120 a trigger is defined, which causes an inference engine to be invoked in step 126. The inference engine uses network grouping information as well as configuration policy information. Therefore, the inference engine 114 may receive data from the steps of define network grouping (step 122), and define configuration policies (step 124). Typically the network grouping and configuration policies will be previously defined, and the inference engine receives the resulting data. After the inference engine is invoked, and conflicts are determined and resolved, appropriate action is taken as shown in step 128. The inference engine represents a preferred embodiment of this invention. However, from the following description, it will be clear that there may be other alternatives to an inference engine as disclosed, that are within the scope of this invention as described and claimed.

Figure 13:
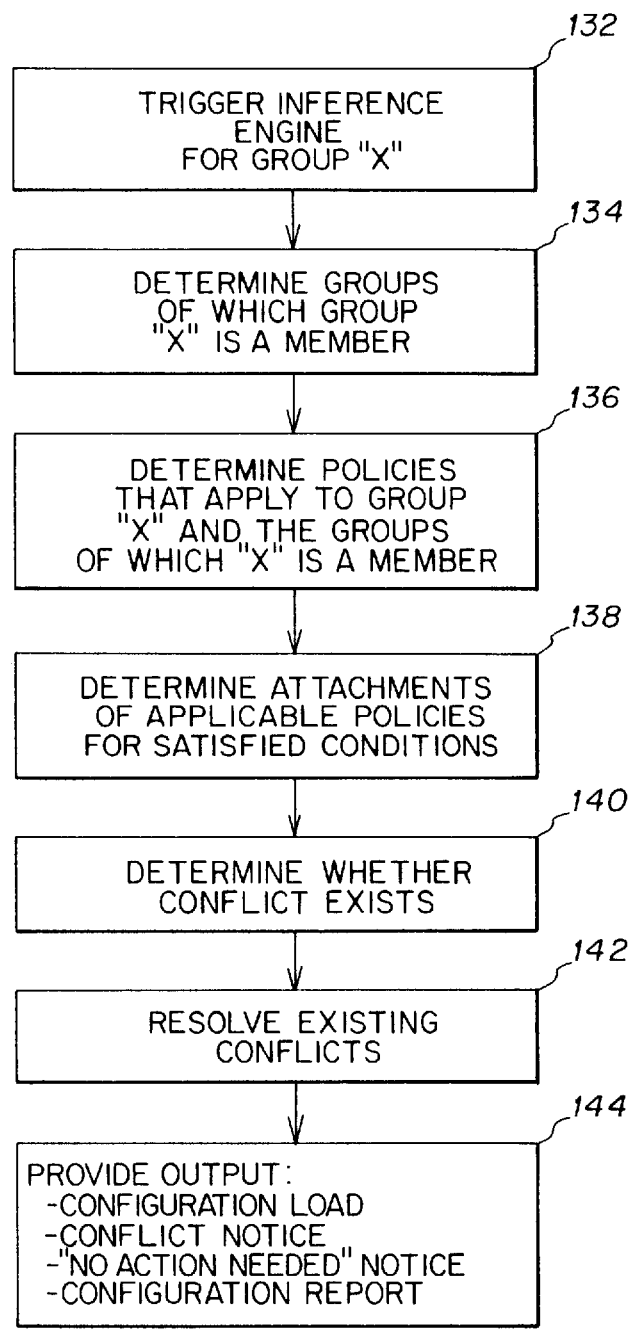
FIG. 13 shows more detail of steps performed by the inference engine depicted in FIG. 8 and FIG. 12.

The function of the inference engine is to assure that configuration policies are enforced. FIG. 13 is a flow chart showing steps taken by the inference engine 114. In step 132, an event triggers the inference engine for a particular group "X". In a preferred embodiment, a single inference engine exists which may be triggered with respect to any group. Step 132 means that group "X" will be examined to determine whether any conflicts exist with respect to group "X". There are several ways to perform step 132, and the manner in which to perform the trigger may be user selectable. The following list is exemplary of events which may provide a trigger:

activation of a device
deactivation of a device
activation of a network
deactivation of a network
addition of a new device to a network
determination by a scheduler
manual determination by a user Once a trigger has been received, the inference engine 114 determines the groups of which group "X" is a member 134. This may be performed by cycling through a network grouping data structure by following "is a member of" links that were described earlier. A recursive search may be implemented so that all groupings are detected for group "X."

In step 136, the groups of which group "X" is a member, including group "X" itself, are searched to determine applicable policies. From the results of step 136, the attachments of the applicable policies are examined in step 138 to determine which attachments may conflict due to satisfied conditions. For example, the conditions of either a policy application or an attachment may define different parts of the day, or other conditions which might make two attachments not be in conflict.

From the applicable attachments, a determination is made as to whether a conflict exists (step 140). It should be noted that there may or may not be any conflicts in existence at the time of the trigger event. It is therefore possible that the inference engine will determine that no conflicts exist. Typically, step 140 may be performed by comparing specific attribute/value pairs of two attachments. If any conflict exists, the conflict is resolved in step 142, more detail of which is described below. If no conflicts exist, then the process proceeds to step 144. In step 144, output is provided. The output may be user selectable, and include: a configuration load (see item 26 of FIG. 1 and associated description); a conflict notice that describes the conflicting configurations; a notice of "no action needed", for example if there are no conflicts; and a configuration report, that defines the state of the overall network configuration.

In a preferred embodiment, the output of step 142 includes an "enforceable configuration record" (ECR). An ECR is one configuration record that may be applied to group X so that no conflicts exist. For example, an ECR may be created that represents a composite of the attached configuration records for a particular device. In this manner, the configuration defined by the ECR may either be loaded instead of loading configurations defined by other configuration records attached to the device. Alternatively, an ECR may contain only the attributes which are in actual conflict. In such an instance, the configuration of the ECR may be loaded along with the configurations of other attached configuration records.

Figure 14:
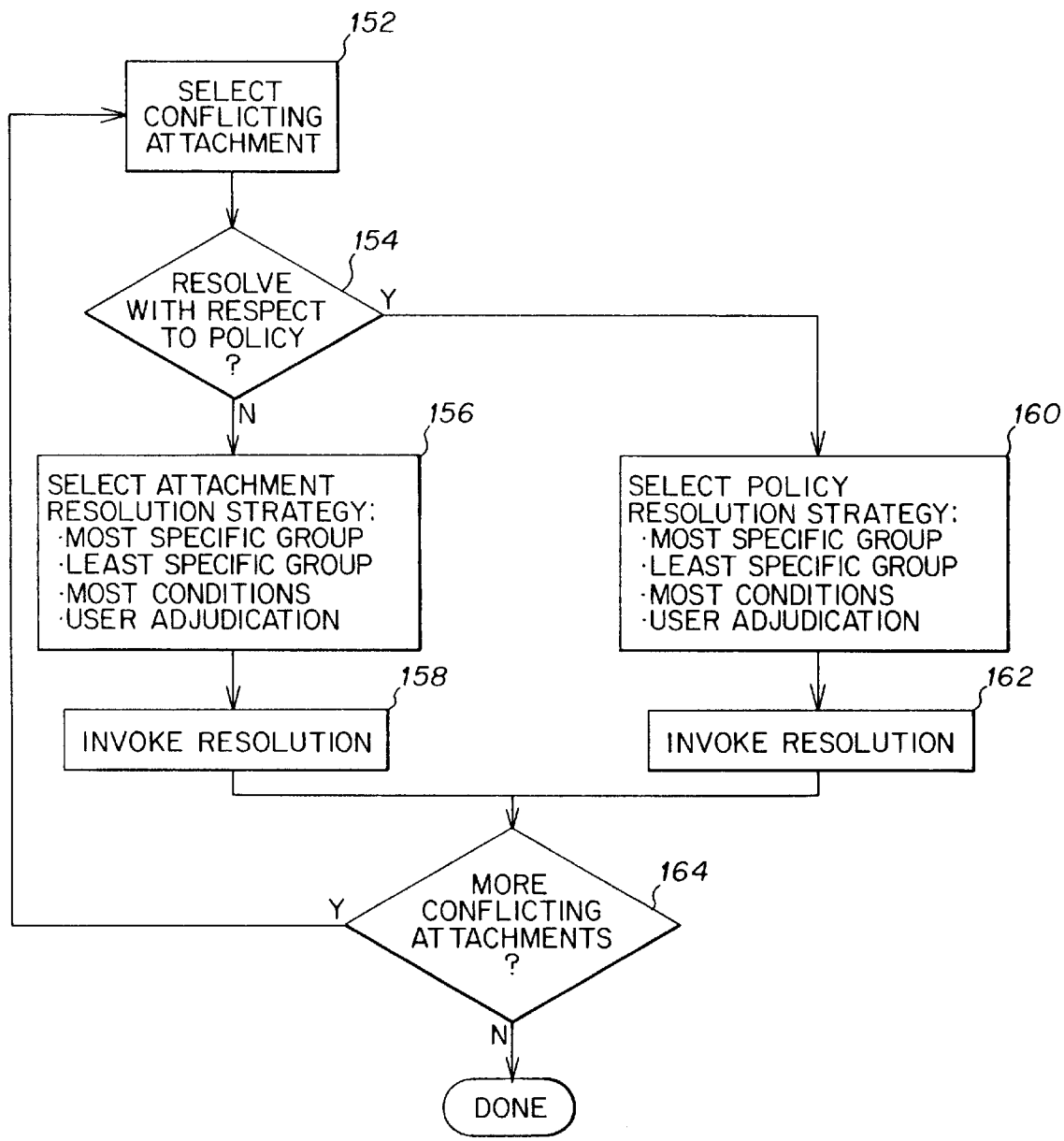
FIG. 14 shows more detail of a conflict resolution step shown in FIG. 13.

FIG. 14 is a flow chart that provides more detail for step 142, in particular the conflict resolution. The flow chart of FIG. 14 shows the flow in an embodiment in which any conflicts are defined in step 140, and the conflicts are resolved in step 142. Alternatively, the process of FIG. 13 may continue with the resolution of an existing conflict after each existing conflict is identified in step 140. Referring to FIG. 13, in step 152, conflicting attachments may be selected, for example from a list of conflicting attachments which may be generated in step 140 of FIG. 13. As described above, a conflicting attachment represents an instance in which more than one value is simultaneously enforceable for a single device attribute.

Since conflicting attachments may result from conflicts in either individual attachments or application of group policies, step 154 determines whether the conflict should be resolved by resolving policy conflicts. Such a decision may represent a user input, or may be preprogrammed. If policy resolution is not selected, then in step 156 an attachment resolution strategy is selected. In this manner, a conflict may either be effectively resolved from the policy perspective or from the attachment perspective. The strategy itself may be user-selectable or preprogrammed. A list of possible resolution strategies includes: most specific group, least specific group, most conditions, and user adjudication.

A most specific group strategy of step 156 means that the value of the lowest level attachment is selected as the value which will be enforced. The term "most specific" means the policy that applies to the lowest level group. For example, as seen in FIG. 11, policy1 applies to device4, and policy12 applies to device4 because policy12 directly applies to group25 of which device4 is a member. Therefore, if line (a) above were contained in policy12, and line (b) were contained in policy1, line(b) would override line (a) if most specific group were selected.

Similarly, "least specific group" of step 156 means that the value of the least specific attachment is selected as the value which will be enforced. In the above example, if least selected group were selected in this instance, then line (a) would override line (b).

Additionally, an attachment which satisfies the most number of conditions may be selected to be enforced, as shown in step 156. For example, if line (a) and line (b) were each part of an attachment that had satisfied conditions, but there were four conditions in the attachment associated with line (a) while there were only two conditions for the attachment associated with line (a), then line (a) would be enforced.

Another alternative in step 156 is to provide user adjudication. In the user adjudication option, conflicting attachments are reported to a user, and the user may decide the desired action. This may be preferred if a user desires to resolve the conflict manually at run time rather than have the conflict resolved by a particular resolution strategy.

In step 158, the appropriate resolution is created, for example by creating an ECR.

Alternatively to step 156, conflicts may be resolved at the policy level, as shown in step 160. In this instance, instead of selecting the conflicting attachment, the conflicting policy is resolved. In a similar manner to step 156, the policy resolution strategy of step 160 may include: most specific group, least specific group, most conditions, and user adjudication. In step 162, the appropriate resolution is created, for example by creating an ECR.

In step 164, if there are additional conflicting attachments, the process continues to step 152 where a next conflicting attachment may be selected for resolution. In this manner, the process may continue until all conflicts are resolved.

This aspect of the invention provides a method and apparatus for defining network groups, defining network policies for groups, determining conflicts and resolving conflicts among groups and devices. Accordingly, a principled approach may be used to define and enforce configuration policies, resulting in network operations which are more fault-tolerant, resulting in better and more effective network management practices.

Having thus described various embodiments of the present invention, additional modifications and improvements will readily occur to those skilled in the art. Accordingly, the foregoing description is by way of example only, and is not intended to be limiting.

What is claimed is:

1. A method for managing configurations of network devices connected in a network comprising the steps of:
    grouping at least one network device to create a network group;
    applying a policy to the network group by modifying a database to associate a configuration record with the network group, the step of applying a policy including the steps of:
        applying a first policy having a first ordering index to the network group;
        applying a second policy having a second ordering index to the network group; and
        loading, over the network, a configuration described by the configuration record into each network device in the network group, the step of loading including loading a first configuration defined by the first policy and a second configuration defined by the second policy in an order defined by the first ordering index and the second ordering index.

2. The method of claim 1, wherein the step of grouping includes the steps of:
    selecting the at least one network device; and
    modifying the database to include a group identifier and an association between the group identifier and each of the at least one network device.

3. The method of claim 2, wherein the step of selecting includes selecting an existing group that includes the at least one network device.

4. The method of claim 1, wherein the step of applying a policy includes the step of applying a policy to a second group of which the network group is a member.

5. The method of claim 1, wherein the step of loading the configuration includes the steps of:
    when the first ordering index has a value that is less than the second ordering index:
        loading the first configuration into each network device in the network group; and
        subsequently loading the second configuration into each network device in the network group; and
    when the second ordering index has a value that is less than the first ordering index:
        loading the second configuration into each network device in the network group; and
        subsequently loading the first configuration described into each network device in the network group.

6. The method of claim 1, wherein the step of applying a policy includes applying a policy having a condition, and wherein the step of loading includes the steps of:
    determining whether the condition is satisfied; and
    loading the configuration described by the configuration record into each network device in the network group when the condition is satisfied.

7. The method of claim 1, further comprising the steps of:
    triggering an enforcement;
    determining whether any conflicts exist among policies that are applied to the network group;
    when the step of determining determines that conflicts exist, resolving the conflicts that exist.

8. A method for enforcing policies that apply to a device in a network, the method comprising the steps of:
    triggering an enforcement;
    determining whether any conflicts exist among policies that are applied to the network, the step of determining whether any conflicts exist including the steps of:
        determining at least one group of which the device is a member;
        determining applicable policies for the at least one group, the applicable policies each having a configuration record that includes attributes associated with attribute values; and
        determining whether a first applicable policy of the applicable policies has a first configuration record that includes a first value associated with a first attribute, and a second applicable policy of the applicable policies has a second configuration record that includes a second value associated with the first attribute, a conflict existing when the second value is different from the first value;
    when the step of determining determines that a conflict exists, resolving the conflict.

9. The method of claim 8, wherein the step of triggering includes the steps of:
    selecting a trigger event; and
    triggering according to the trigger event.

10. The method of claim 9, wherein the step of triggering includes determining at least one of:
    when a device on the network has been activated;
    when a device on the network has been deactivated;
    when the network has been activated;
    when the network has been deactivated
    when a device has been added to the network;
    when a scheduler has determined the trigger event; and
    when a user has manually triggered the trigger event.

11. The method of claim 8, wherein the step of determining applicable policies for the group includes the steps of:
    searching a database to determine a plurality of policies that are associated in the database with the group;
    characterizing each of the plurality of policies as one of a policy having a condition and a policy having no conditions;
    characterizing each of the plurality of policies having a condition as one of a policy having a satisfied condition and a policy having an unsatisfied condition; and
    determining the applicable policies to be each policy having a satisfied condition and each policy having no conditions.

12. The method of claim 8, wherein the step of resolving includes the steps of:

selecting a resolution strategy; and selecting a policy from a plurality of applicable policies according to the resolution strategy.

13. The method of claim 12, wherein the step of selecting a resolution strategy includes selecting one of:

a most specific group strategy that includes selecting an applicable policy that more specifically defines a policy of the device than the other of the plurality of applicable policies;

a least specific group strategy that includes selecting an applicable policy that less specifically defines a policy of the device than the other of the plurality of applicable policies;

a most conditions satisfied strategy that includes selecting from the plurality of applicable policy an applicable policy that includes a largest number of satisfied conditions; and a user adjudication strategy that includes enabling a user to select a policy from the plurality of applicable policies.

14. The method of claim 8, wherein the step of resolving includes the steps of:

selecting a resolution strategy; and selecting a configuration record from a plurality of applicable configuration records according to the resolution strategy.

15. The method of claim 14, wherein the step of selecting a resolution strategy includes selecting one of:

a most specific group strategy that includes selecting an applicable configuration record that more specifically defines a configuration of the device than the other of the plurality of applicable policies;

a least specific group strategy that includes selecting an applicable configuration record that less specifically defines a configuration of the device than the other of the plurality of applicable policies;

a most conditions satisfied strategy that includes selecting from the plurality of applicable configuration records an configuration record that includes a largest number of satisfied conditions; and a user adjudication strategy that includes enabling a user to select a configuration record from the plurality of applicable configuration records.

16. The method of claim 8, further comprising a step of providing an output.

17. The method of claim 16, wherein the step of providing an output includes the steps of:

creating an enforceable configuration report; and loading a configuration associated with the enforceable configuration report into the device.

18. The method of claim 16, wherein the step of providing an output includes creating a conflict notice.

19. The method of claim 16, wherein the step of providing an output includes creating a notice that no action is needed.

20. The method of claim 16, wherein the step of providing an output includes creating a configuration report that defines an overall configuration of the network.

21. An apparatus for managing configurations of network devices connected in a network comprising:

a database that includes an association of a configuration record with at least one network device in a network group, the database including:

an association of a first policy having a first ordering index with the network group; and an association of a second policy having a second ordering index with the network group; and means for loading, over a network, a configuration described by the configuration record into each network device in the network group, the means for loading including means for loading a first configuration defined by the first policy and a second configuration defined by the second policy in an order defined by the first ordering index and the second ordering index.

22. The apparatus of claim 21, further comprising:

means for selecting the at least one network device;

means for modifying the database to include a group identifier and an association between the group identifier and each of the at least one network device.

23. The apparatus of claim 22, wherein the means for selecting includes means for selecting an existing group that includes the at least one network device.

24. The apparatus of claim 21, wherein the database includes a second association that associates a policy with a second group of which the network group is a member.

25. The apparatus of claim 21, wherein the means for loading the configurations includes:

means for loading the first configuration into each network device in the network group, and for subsequently loading the second configuration into each network device in the network group when the first ordering index has a value that is less than the second ordering index; and means for loading the second configuration into each network device in the network group, and for subsequently loading the first configuration into each network device in the network group when the second ordering index has a value that is less than the first ordering index.

26. The apparatus of claim 21, wherein the database includes an association of a policy having a condition, and wherein the means for loading includes:

means for determining whether the condition is satisfied; and means for loading the configuration described by the configuration record into each network device in the network group when the condition is satisfied.

27. The apparatus of claim 21, further comprising:

a trigger;

an inference engine, responsive to the trigger, that determines whether any conflicts exist among policies that are applied to the network group, and resolves the conflicts that exist.

28. An apparatus for enforcing policies that apply to a device in a network, the apparatus comprising:

a trigger;

an inference engine that determines whether any conflicts exist among policies that are applied to the network and resolves the conflicts that exist, the inference engine including:

means for determining at least one group of which the device is a member;

means for determining applicable policies for the at least one group, the applicable policies each having a configuration record that includes attributes associated with attribute values; and means for determining whether a first applicable policy of the applicable policies has a first configuration record that includes a first value associated with a first attribute, and a second applicable policy of the applicable policies has a second configuration record that includes a second value associated with the first attribute, wherein a conflict exists if the second value is different from the first value.

29. The apparatus of claim 28, wherein the trigger includes:
   a selected trigger event; and
   means for triggering according to the selected trigger event.

30. The apparatus of claim 29, wherein the means for triggering includes means for determining at least one of:
   when a device on the network has been activated;
   when a device on the network has been deactivated;
   when the network has been activated;
   when the network has been deactivated;
   when a device has been added to the network;
   when a scheduler has determined the trigger event; and
   when a user has manually triggered the trigger event.

31. The apparatus of claim 28, wherein the means for determining applicable policies for the group includes:
   means for searching a database to determine a plurality of policies that are associated in the database with the group;
   means for characterizing each of the plurality of policies as one of a policy having a condition and a policy having no conditions;
   means for characterizing each of the plurality of policies having a condition as one of a policy having a satisfied condition and a policy having an unsatisfied condition; and
   means for determining the applicable policies to be each policy having a satisfied condition and each policy having no conditions.

32. The apparatus of claim 28, wherein the inference engine includes:
   means for selecting a resolution strategy; and
   means for selecting a policy from a plurality of applicable policies according to the resolution strategy.

33. The apparatus of claim 32, wherein the means for selecting a resolution strategy includes means for selecting one of:
   a most specific group strategy that includes selecting an applicable policy that more specifically defines a policy of the device than the other of the plurality of applicable policies;
   a least specific group strategy that includes selecting an applicable policy that less specifically defines a policy of the device than the other of the plurality of applicable policies;
   a most conditions satisfied strategy that includes selecting from the plurality of applicable policy an applicable policy that includes a largest number of satisfied conditions; and
   a user adjudication strategy that includes enabling a user to select an applicable policy from the plurality of policies.

34. The apparatus of claim 28, wherein the inference engine includes:
   means for selecting a resolution strategy; and
   means for selecting a configuration record from a plurality of applicable configuration records according to the resolution strategy.

35. The apparatus of claim 34, wherein the means for selecting a resolution strategy includes means for selecting one of:
   a most specific group strategy that includes selecting an applicable configuration record that more specifically defines a configuration of the device than the other of the plurality of applicable configuration records;
   a least specific group strategy that includes selecting an applicable configuration that less specifically defines a configuration of the device than the other of the plurality of applicable configuration records;
   a most conditions satisfied strategy that includes selecting from the plurality of applicable configuration records an applicable configuration record that includes a largest number of satisfied conditions; and
   a user adjudication strategy that includes enabling a user to select a configuration record from the plurality of applicable configuration records.

36. The apparatus of claim 28, wherein the inference engine has an output that includes an enforceable configuration report.

37. The apparatus of claim 36, further comprising means for loading a configuration associated with the enforceable configuration report into the device.

38. The apparatus of claim 28, wherein the inference engine has an output that includes a conflict notice.

39. The apparatus of claim 28, wherein the inference engine has an output that includes a notice that no action is needed.

40. The apparatus of claim 28, wherein the inference engine has an output that includes a configuration report that defines an overall configuration of the network.

* * * * *